United States Patent [19]
Bernard et al.

[11] Patent Number: 5,607,592
[45] Date of Patent: Mar. 4, 1997

[54] PROCESS AND DEVICE FOR THE SEPARATION OF SUBSTANCES DISSOLVED IN THE WASHING WATER USED IN PROCESSING BATH OF A PHOTOGRAPHIC FILM

[75] Inventors: Patrick E. Y. Bernard, Chagny; Guy A. J. Manas, Saint-Remy, both of France

[73] Assignee: Eastman Kodak Company, Rochester, N.Y.

[21] Appl. No.: 490,284

[22] Filed: Jun. 14, 1995

[30] Foreign Application Priority Data

Jun. 17, 1994 [FR] France .................................. 94 07687

[51] Int. Cl.⁶ ...................................................... B01D 61/00
[52] U.S. Cl. .......................... 210/641; 210/651; 210/652; 210/653; 210/195.2
[58] Field of Search ..................................... 210/651, 653, 210/652, 195.2, 195.1, 257.2, 641; 134/10

[56] References Cited

U.S. PATENT DOCUMENTS 4,451,132  5/1984  Kishimoto ........................... 210/195.2
4,610,792  9/1986  Van Gils et al. ....................... 210/650
5,164,092  11/1992  Munch .................................. 210/651

FOREIGN PATENT DOCUMENTS 0409065  1/1991  European Pat. Off. .
0407979  1/1991  European Pat. Off. .
2684024  5/1993  France .
3143106  5/1983  Germany .
3246897  6/1983  Germany .

*Primary Examiner*—Ana Fortuna
*Attorney, Agent, or Firm*—Frank Pincelli

[57] ABSTRACT

The present invention concerns a process and a device for the separation of substances dissolved in the washing waters used in a processing bath for a photographic film.

The photographic film, after passing through the processing bath, is caused to pass successively through at least two washing tanks, the process consisting of causing the waste water from the washing baths to circulate through a nanofiltration membrane device, the permeate from the said nanofiltration device being recirculated to the washing tank or tanks other than the last of the tanks in which the film passes, the last of the tanks being fed with clean water from an auxiliary source.

9 Claims, 3 Drawing Sheets

PROCESS AND DEVICE FOR THE SEPARATION OF SUBSTANCES DISSOLVED IN THE WASHING WATER USED IN PROCESSING BATH OF A PHOTOGRAPHIC FILM

FIELD OF THE INVENTION

The present invention concerns a process for the separation of photographic chemical products from washing water used downstream of a processing bath, and for their recovery. The invention also concerns a device for implementing the process.

BACKGROUND OF THE INVENTION

Many manufacturing or conversion processes produce waste water which, on the one hand, cannot be discharged directly to the drains because of their composition and, on the other hand, contain precious substances whose recovery and reuse would be economically advantageous. One example is the photographic processing industry, in which films and exposed photographic papers pass through several processing baths, after which the chemical products must to a great extent be removed from the finished products. Such photographic film processes are well known (see for example Chimie et Physique Photographiques; Pierre Glafkides; Vol 2; Chap XL, pages 947–967) and consequently do not require any further description. These processes produce washing water which contains, in relatively low concentrations, chemical products whose separation was very expensive with the processes known up till now.

With photographic development processes, in fact, the processing usually had to take place in two stages, the salts being eliminated from the solution by ion exchange and the organic chemical products by absorption, for example using active charcoal. By means of a subsequent process using additional chemical products, the substances eliminated from the solutions then had to be separated once again from the resins used for elimination, or from the active charcoal. Evaporation or distillation are also used for separating dissolved substances. However, for highly dilute solutions, these processes are expensive because of the high expenditure of energy which they involve.

The patent application FR-A-2 684 024 describes a process for separating components essentially dissolved in a liquid, for the purpose of recycling the liquid and/or the components. FIG. 1, to which reference is now made, illustrates diagrammatically the device used for implementing the process described in the above-mentioned application. As is clear from FIG. 1, the waste water coming from a processing area 1 and containing, at a relatively low concentration, dissolved constituents, must be purified and reprocessed. From the processing area 1, the waste water arrives at a feed or a first reservoir 2, from which a set of membranes is fed, consisting of two filters with separate membranes. It is the membrane filter 6, intended for separating constituents at a high flow rate and low concentration, which is fed first. The filtration residue is returned, from the first membrane filter 6, to the feed, that is to say to the first reservoir 2, as a result of which the waste water or liquid contained in the latter have a higher concentration. This filtration process is repeated until the concentration in the reservoir 2 has reached a certain value, after which the liquid or waste water is taken to the second membrane filter 7, suitable for a reduced flow rate while providing separation to a higher concentration. A reduction in the flow rate is possible, since a large part of the waste water to be treated is already purified. The filtration residue arriving in the second membrane filter is returned to the reservoir 2, after which the concentration in the latter increases still further. This increase in the concentration continues until the concentration reaches a value at which the dissolved components can be reused in this form as chemical products, or at which they can be separated from the solvent by means of known suitable and inexpensive processes.

Such a process, even if it satisfactorily assists in resolving the problems mentioned above, has other drawbacks. The first lies in the fact that the water recirculated and transferred to a reservoir 13 before being re-routed to the processing machine, is readmitted into the washing circuit at a rinsing tank through which the photographic film is being drawn. One of the problems in such an approach relates to the fact that the degree of cleanliness of the recirculated water admitted into the last rinsing tank in which the film is passing may be insufficient. This entails, in the case of a processing bath preceding another bath, a contamination of the second processing bath by drawing chemical products from the first bath to the second. In addition, when the last treatment bath is involved, the photographic film is not perfectly clean, which poses problems of preserving the physical or sensitometric qualities of the film.

One of the objects of the present invention is therefore to provide a device and a process for the separation of substances dissolved in the rinsing waters used downstream of a photographic film processing bath which do not have the drawbacks mentioned above.

Other objects of the present invention will emerge in more detail from the following description.

SUMMARY OF THE INVENTION

These objects are achieved by means of a process for the separation of substances dissolved in the rinsing water used in processing baths for a photographic film, the said photographic film, after passing through the said processing bath, being made to pass in succession through at least two washing tanks, the said process consisting of circulating the waste water coming from the washing tanks through a nanofiltration device, the permeate from the said nanofiltration device being recirculated in the washing tank or tanks other than the last of the tanks through which the film passes, the last of the tanks being fed with clean water from an auxiliary source.

According to a particular embodiment of the present invention, the process comprises the following steps:

a) discharging the waste water from the washing tanks to a buffer reservoir;

b) circulating the waste water from the buffer reservoir through a nanofiltration device, the permeate from the said nanofiltration device being discharged to an auxiliary reservoir;

c) recirculating the contents of the auxiliary reservoir in the washing tank or tanks other than the last of the tanks through which the film passes; and d) supplying the last of the tanks with clean water from an auxiliary source.

According to the present invention, a device for the separation of substances dissolved in the washing water used in a processing bath of a photographic film is also produced, the said photographic film, after passing through the said processing bath, being made to pass successively through at least two washing tanks, the said device comprising:

a) a nanofiltration device;

b) means for recirculating the permeate from the said nanofiltration device in the washing tank or tanks other than the last of the tanks through which the film passes; and c) means for supplying the last of the tanks with clean water from an auxiliary source.

Advantageously, the device according to the present invention comprises:

a) a buffer reservoir for collecting the waste water;

b) means for discharging the waste water from the washing tanks to the said buffer reservoir;

c) a nanofiltration device;

d) means for circulating the waste water from the buffer reservoir through the said nanofiltration device;

e) an auxiliary reservoir for discharging the permeate from the nanofiltration device;

f) means for recirculating the contents of the auxiliary reservoir in the washing tank or tanks other than the last of the tanks in which the film passes; and g) means for supplying the last of the washing tanks with clean water from an auxiliary source.

During the following description, reference will be made to the drawing in which:

DETAILED DESCRIPTION OF THE INVENTION

Figure 1:
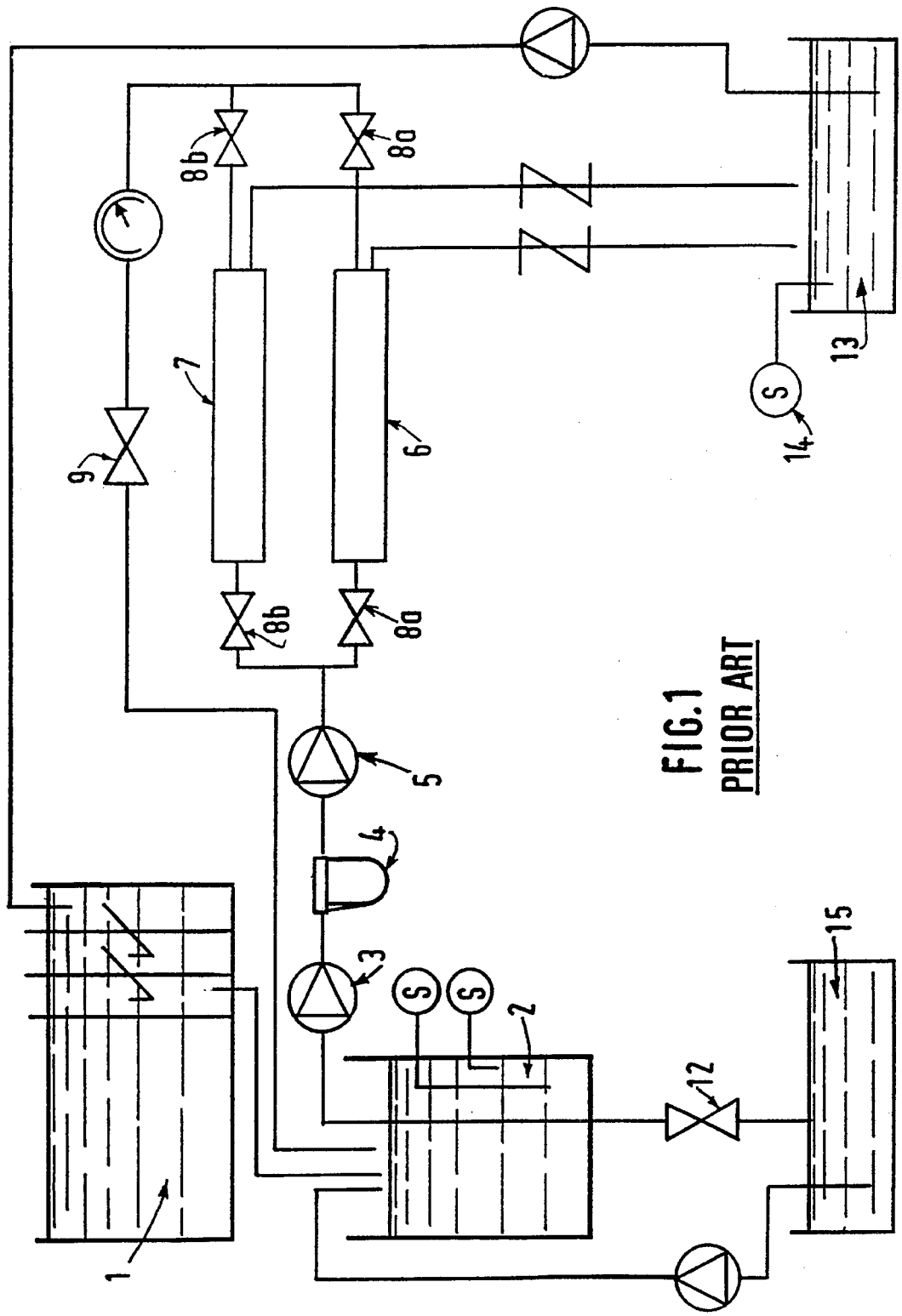
FIG. 1 shows diagrammatically a conventional device for separating constituents dissolved in a liquid.
Figure 2:
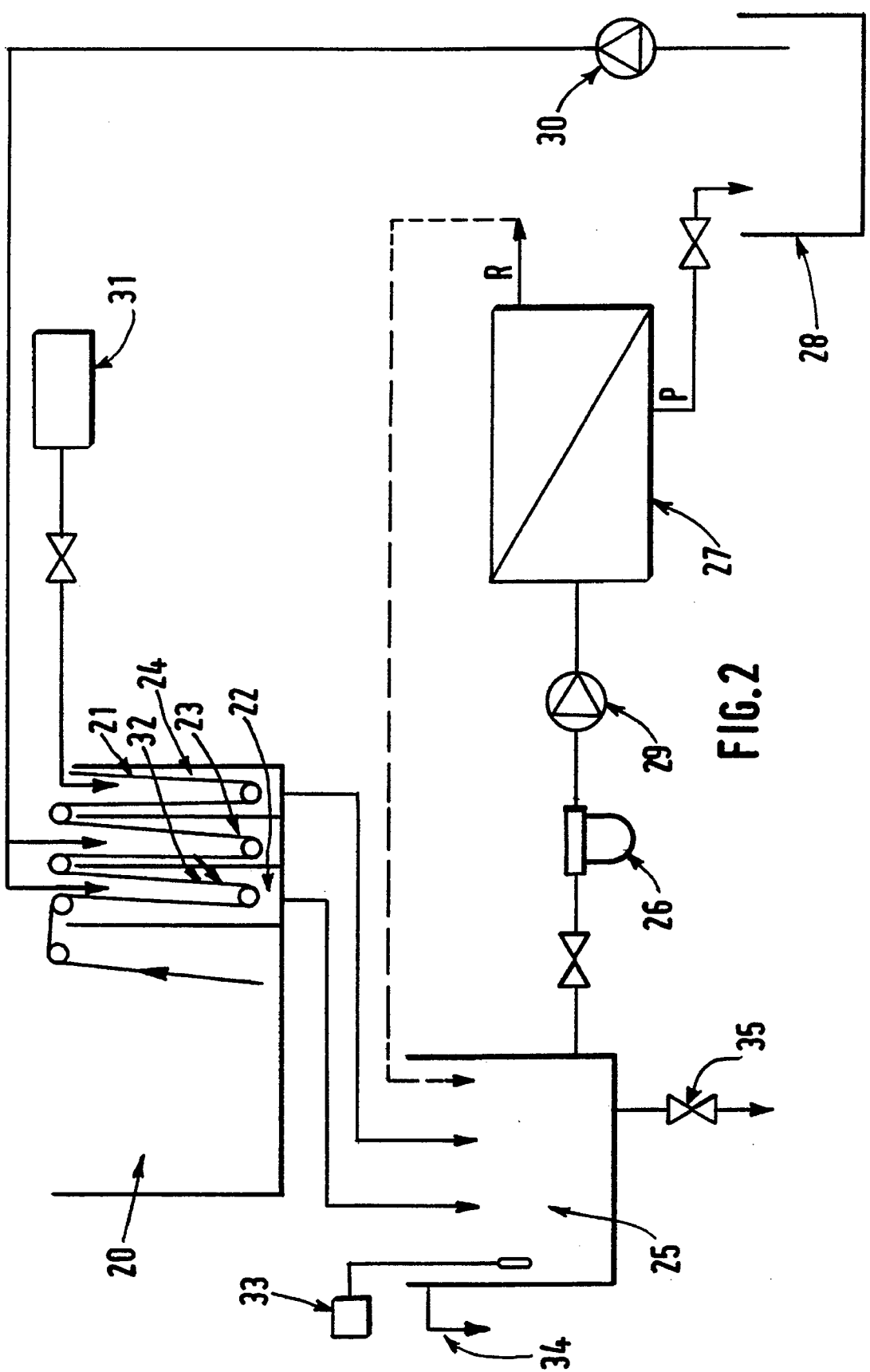
FIG. 2 shows diagrammatically a first embodiment of the separation device according to the present invention.

FIG. 2, to which reference is now made, shows diagrammatically an embodiment of the device used for implementing the process according to the present invention. The waste water from the washing tanks 22, 23, 24 of a photographic processing device 20 is discharged to a buffer reservoir 25. The device according to the invention can be used at the outlet from any washing tank. For example, it may be a washing tank placed downstream of a chromogenic developer bath, a fixing bath or a bleaching bath. It is, however, particularly advantageous to use it at the outlet from the last fixing bath. From the buffer reservoir the waste water is routed through a nanofiltration membrane device 27 by means of a high-pressure pump 29. In fact, the process on which the present invention is based basically uses membranes for separating the dissolved substances or chemical products from dilute solutions. Such membranes in principle behave as large-surface sieves having, as "holes", pores of microscopic or molecular size, the dimensions of which must be highly regular so that, as from a given size, molecules are retained, while smaller molecules or the ions of simple salts pass through the membrane. Membranes for ultra-filtration generally allow molecules to pass whose molecular weight is less than approximately 2000, while the molecules whose molecular weight is higher are retained. With nanofiltration, which is important for the present invention, this limit is situated at a molecular weight of around 200. Membranes for nanofiltration of this type are characterised by high selectivity and have higher flow rates. According to a first embodiment, a nanofiltration membrane or a set of such membranes 27 is used, producing a permeate P of 80% (which passes through the membrane) and a residue R of 20% (which is stopped by the membrane).

The purified water (the permeate P) at the outlet from the nanofiltration membrane is discharged to an auxiliary reservoir 28 in order to be readmitted into the processing device by means of a pump 30. According to one important characteristic of the present invention, the purified water is admitted into the washing tank or tanks 22, 23 other than the last washing tank 24 in which the photographic film 21 passes, before leaving the corresponding processing station. The washing tanks can be arranged in different ways. In the embodiment shown, the device comprises three washing tanks 22, 23, 24. The recirculated purified water is introduced into the first two tanks 22, 23. According to another embodiment, the recirculated water is introduced into the second tank only, the first tank and the second tank communicating with each other in the direction indicated by the arrow 32 by means of suitable pipes. Likewise, depending on the connections existing between the different washing baths 22, 23, 24, the discharge of the waste water to the buffer reservoir 25 can take place through one, two or three washing baths. According to another characteristic of the present invention, clean water is added to the last of the washing tanks from an auxiliary source 31. A commonly accepted definition of the concept of clean water is given for guidance in Photographic Science and Engineering, Volume 9, No 6, November–December 1965, pages 398–413. In this extract, examples of proportions of different constituents of clean water are given. This approach makes it possible to have a last washing tank which is also clean, which limits the entrainment of chemical products from one bath to another and, in the case of the use, for the last processing bath of the photographic development process, to preserve the physical and sensitometric characteristics of the film. The quantity of water added depends partly on the level of residue from the nanofiltration device. For example, in the case of a filtration process with a throughput of 80% and a residue level of 20%, 20% of water is added. The buffer reservoir 25 is equipped with appropriate means (such as overflow discharge means 34) for compensating for the variations in volume in the separation circuit.

As shown in broken lines, the residue R from the nanofiltration device 27 may be either discharged from the circuit, for example, to an auxiliary processing device (not shown), or recirculated to the buffer reservoir 25. Means 33, such as, for example, conductimetric means, are provided for measuring the concentration of the solution in the reservoir 25 and discharging some of its contents when these reach or exceed a certain value. For example, a valve 35 may be provided to enable the excess to be discharged.

Figure 3:
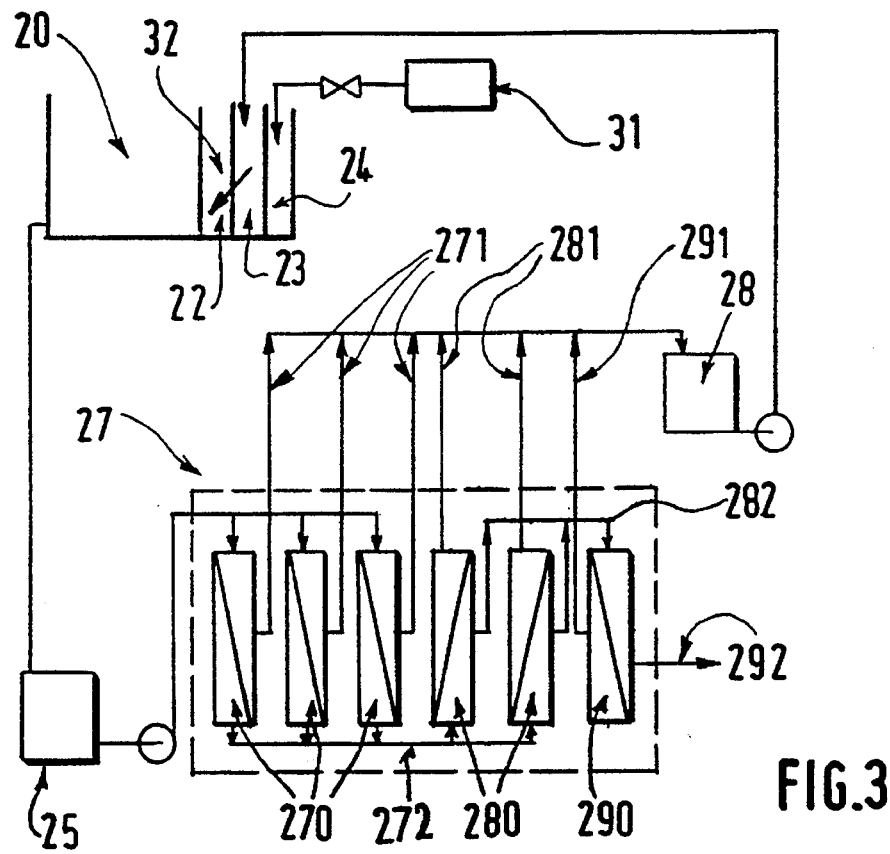
FIG. 3 shows another embodiment of the separation device according to the present invention.

FIG. 3, to which reference is now made, illustrates another embodiment in which the membrane filter device comprises a plurality of nanofiltration modules 270, 280, 290 disposed in series. The first module 270 comprises three membrane filters in parallel, from which the purified water (the permeate) 271 is discharged to the auxiliary reservoir 28. The residue 272 from the filter 270 is sent to the inlet of the second module 280 comprising two membrane filters disposed in parallel, from which the purified water 281 is discharged to the auxiliary reservoir 28. The residue from the filter 280 is sent to the inlet of the third module 290 comprising a membrane filter, from which the purified water 291 is discharged to the auxiliary reservoir 28. The residue 292 is discharged in order to be reprocessed in a suitable manner or to be recirculated to the buffer reservoir 25. The advantage of using nanofiltration filters in series lies in the fact that the throughputs and yields of the device can be improved considerably.

By way of example, the following values of throughputs can be used:

rate of discharging waste water to the buffer reservoir: 1500 l/h;

rate of feed of each of the filters in the module 270: 500 l/h;

flow rate of permeate at the discharge from each of the filters in the module 270: 200 l/h;

flow rate of the residue at the discharge from each of the filters in the module 270: 300 l/h;

feed rate of each of the filters in the module 280: 450 l/h;

flow rate of the permeate at the discharge from each of the filters in the module 280: 200 l/h;

flow rate of the residue at the discharge from each of the filters in the module 280: 250 l/h;

feed rate of the filter in the module 290: 500 l/h;

flow rate of the permeate at the discharge from the filter in the module 290: 200 l/h; and flow rate of the residue at the discharge from the filter in the module 290: 300 l/h.

Figure 4:
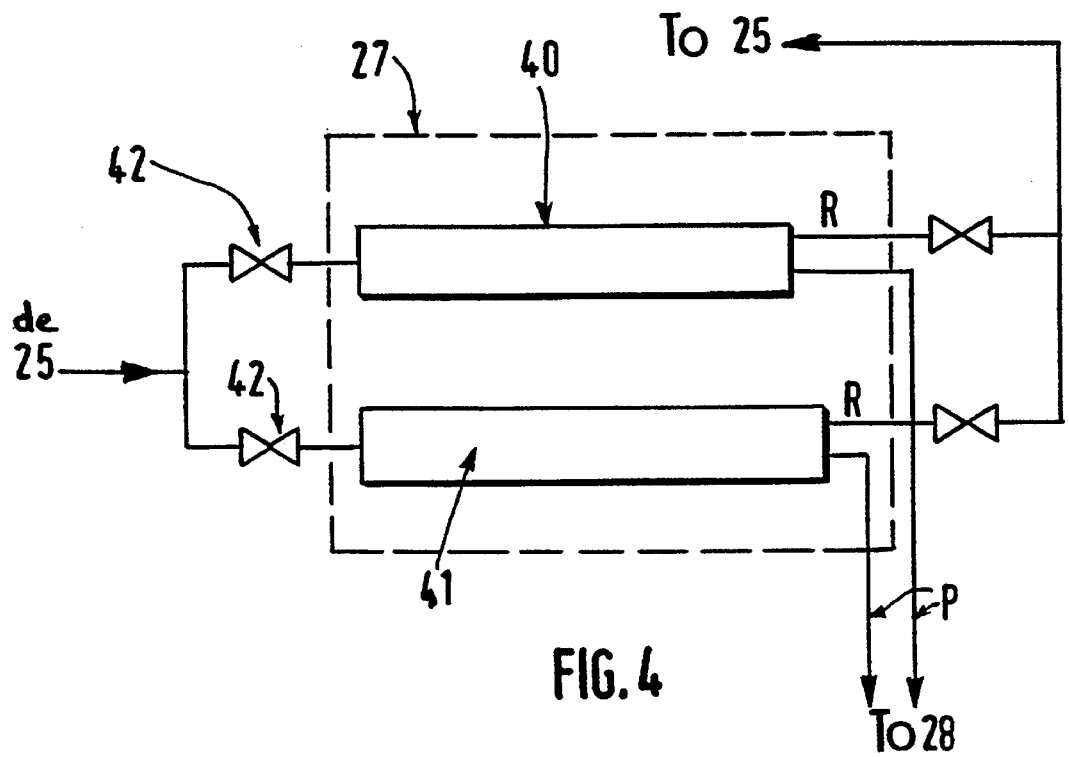
FIG. 4 shows another embodiment of the filtration device used for implementing the process according to the invention.

According to another embodiment, the filtration module is of the type shown in FIG. 4. According to this embodiment, the liquid to be treated coming from the buffer reservoir 25 is taken first of all to a nanofiltration membrane 40 suitable for separation at a high throughput and with a low concentration of constituents in the liquid and from which the filtration residue is taken to the buffer reservoir 25, inside which the liquid to be treated is subjected to an increase in concentration until the concentration reaches a certain value. As from this certain value, the liquid with an increased concentration is drawn through an ultra-filtration membrane 41 suitable for separation at a reduced throughput compared with the first filter and with a higher concentration of constituents in the liquid. For this purpose, means are provided for measuring the concentration in the buffer reservoir 25. The result of this measurement determines the selection of one or other of the filtration devices by means of valves 42. The permeate from each of the membranes is discharged to the auxiliary reservoir 28 in order, as described previously, to be readmitted to the processing bath washing circuit, in the washing tanks other than the last tank through which the film passes.

It is to be understood that various other changes and modifications may be made without departing from the scope of the present invention. The present invention being defined by the following claims:

Parts List

20 . . . processing device
21 . . . film
22,23,24 . . . washing tanks
25 . . . buffer reservoir
27 . . . membrane device
28 . . . reservoir
29 . . . high-pressure pump
30 . . . pump
31 . . . auxiliary source
32 . . . arrow
34 . . . overflow discharge means
35 . . . valve
40 . . . nanofiltration membrane
41 . . . ultra-filtration membrane
42 . . . valves
270,280,290 . . . nanofiltration modules
271,281 . . . purified water
272,292 . . . residue

We claim:

1. A process for the separation of substances dissolved in washing water used in a processing bath for a photographic film, said photographic film being made to pass through a series of at least two washing tanks, said series having a last washing tank at which the film leaves the processing bath, the process comprising the steps of circulating waste water coming from the washing tanks through a nanofiltration membrane device, the permeate from said nanofiltration membrane device being recirculated in the washing tank or tanks other than the last washing tank, the last washing tank is being fed with clean water from an auxiliary source, said nanofiltration device comprising a plurality of nanofiltration modules disposed in series, each of the modules having one or more nanofiltration membranes disposed in parallel.

2. A process according to claim 1 further comprising the step of:

a) discharging the waste water from the washing tanks to a buffer reservoir, prior to circulating through said nanofiltration membrane device.

3. A process according to claim 2, further comprising the step of:

recirculating the residue coming from the nanofiltration device to the buffer reservoir, said reservoir is provided with means for discharging some of its content, when the concentration in the reservoir reaches a given value.

4. A process according to claim 2 further comprising the steps of:

discharging the permeate obtained to an auxiliary reservoir prior to recirculating to said tanks.

5. A device for the separation of substances dissolved in washing water used in a processing bath for a photographic film, said photographic film being caused to pass through a series at least two washing tanks, said series having a last washing tank at which the film leaves the processing bath said device comprising:

a) a nonofiltration membrane device comprising a plurality of nanofiltration modules disposed in series, each of the modules having one or more nanofiltration membrane in parallel;

b) means for recirculating the permeate form said nanofiltration device in the washing tank or tanks other than the last washing tank;

c) means for supplying the last washing tank with clean water from an auxiliary source.

6. A device according to claim 5 further comprising:

a) a buffer reservoir for collecting waste water from said processing bath;

b) means for discharging the waste water from the washing tanks to said buffer reservoir;

c) means for recirculating the waste water from the buffer reservoir through said nanofiltration membrane device;

d) an auxiliary reservoir for discharging the permeate from the nanofiltration device; and e) means for recirculating the content of the auxiliary reservoir in the washing tank or tanks other than the last washing tank.

7. A device according to claim 6 and further comprising:

f) means for recirculating the residue form the nanofiltration device to the buffer reservoir; and g) means for discharging, when the concentration of the buffer reservoir reaches a given value, some the content of said buffer reservoir.

8. A device according to claim 7, further comprising:

h) an ultrafiltration membrane device connected to said buffer reservoir; and i) means for selectively causing the liquid form the buffer reservoir to pass through the nonofiltration membrane device or through the ultrafiltration membrane device.

9. A device according to claim 8, in which said means i) comprise means for measuring the concentration in the buffer reservoir.

* * * * *